United States Patent
Hasselberg et al.

(10) Patent No.: US 6,286,042 B1
(45) Date of Patent: Sep. 4, 2001

(54) SYSTEM AND METHOD FOR COMMUNICATIONS MANAGEMENT WITH REDUNDANCY

(75) Inventors: Jonas Hasselberg; Peter Björn; Lena Högberg; Lars Jensen, all of Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/053,947

(22) Filed: Apr. 3, 1998

Related U.S. Application Data

(63) Continuation of application No. PCT/SE96/01287, filed on Oct. 9, 1996.

(30) Foreign Application Priority Data

Oct. 9, 1995 (SE) .................................................. 9503486

(51) Int. Cl.$^7$ ...................... G06F 15/173; G06F 15/163; G06F 9/00; G06F 9/46
(52) U.S. Cl. ...................... 709/223; 709/316; 707/10; 707/202; 707/103
(58) Field of Search ................................... 709/223, 220, 709/221, 226, 300, 303, 202, 203, 316; 707/10, 202, 103

(56) References Cited

U.S. PATENT DOCUMENTS

| | | | | |
|---|---|---|---|---|
| 4,714,996 | * | 12/1987 | Gladney et al. ..................... | 707/203 |
| 5,014,192 | * | 5/1991 | Mansfield et al. ....................... | 707/9 |
| 5,317,568 | * | 5/1994 | Bixby et al. ......................... | 370/401 |
| 5,317,742 | * | 5/1994 | Bapat .................................... | 709/300 |
| 5,434,994 | * | 7/1995 | Shaheen et al. ..................... | 707/201 |
| 5,475,817 | * | 12/1995 | Waldo et al. ......................... | 709/303 |
| 5,485,455 | * | 1/1996 | Dobbins et al. ...................... | 370/60 |
| 5,488,723 | * | 1/1996 | Baradel et al. ...................... | 709/303 |
| 5,491,822 | * | 2/1996 | Allen et al. .......................... | 709/303 |
| 5,550,976 | * | 8/1996 | Henderson et al. .................. | 709/201 |
| 5,555,375 | * | 9/1996 | Sudama et al. ...................... | 709/226 |
| 5,561,769 | * | 10/1996 | Kumar et al. ........................ | 709/202 |
| 5,586,255 | * | 12/1996 | Tanaka et al. ....................... | 709/223 |
| 5,586,310 | * | 12/1996 | Sharman .............................. | 707/10 |
| 5,588,147 | * | 12/1996 | Neeman et al. ...................... | 707/1 |

(List continued on next page.)

FOREIGN PATENT DOCUMENTS

| | | |
|---|---|---|
| 93/25051 | 12/1993 | (WO) . |
| 94/23506 | 10/1994 | (WO) . |
| 97/14237 | 4/1997 | (WO) . |

OTHER PUBLICATIONS

"Distributed Systems:Concept and Design", Coulouris et al., Chapter 11, entitled "Replicantion". 1994.*

Kantola, M., et al. Development of TMN to a Family of Switching Network Elements, International Switching Symposium. vol. 1, pp. 75–79. (Oct. 1992).

Sakae, K., et al. A Study on Storing Managed Objects in Object Oriented Database for Local Fiber Optical Networks following Management Information Tree. IEEE Communications Society. pp. 255–259. (Jun. 1992).

(List continued on next page.)

Primary Examiner—Kevin J. Teska
Assistant Examiner—William Thomson
(74) Attorney, Agent, or Firm—Burns, Doane, Swecker & Mathis, L.L.P.

(57) ABSTRACT

Management operations can be sent from a managing system to a number of managed systems over a management interface. Redundancy is provided through replicating a management operation in a first of managed systems and sending the operation to at least one further managed system. A method of replicating management operations is also provided according to which instance operations that correspond to a management operation are established. The method further includes, for each instance operation, examining if any replication conditions are given, and if such are fulfilled, replicating the operation and invoking it in a redundant system.

28 Claims, 3 Drawing Sheets

U.S. PATENT DOCUMENTS

| | | | |
|---|---|---|---|
| 5,608,720 | * | 3/1997 | Biegel et al. .......................... 370/249 |
| 5,608,903 | * | 3/1997 | Prasad et al. .......................... 707/10 |
| 5,704,041 | * | 12/1997 | Allen et al. .......................... 709/303 |
| 5,729,688 | * | 3/1998 | Kim et al. .......................... 709/226 |
| 5,757,669 | * | 5/1998 | Christie et al. .......................... 709/205 |
| 5,758,351 | * | 5/1998 | Gibson et al. .......................... 707/104 |
| 5,799,153 | * | 8/1998 | Blau et al. .......................... 709/223 |
| 5,832,487 | * | 11/1998 | Olds et al. .......................... 707/10 |
| 5,835,757 | * | 11/1998 | Oulid-Aissa et al. .................. 707/10 |
| 5,991,771 | * | 11/1999 | Falls et al. .......................... 707/202 |

OTHER PUBLICATIONS

Widl, W., CCITT:s standardisering av drafstödsnät. Ericsson Review. Nr 2, pp. 34–51 (1991).

Widl, W., et al. In Search of Managed Objects. Ericsson Review. No. 1–2, vol. 69, pp. 34–57 (1992).

CC ITT X. 720 (Jan. 1992).

CC ITT M. 3010 (Oct. 1992).

CC ITT X. 701 (1992).

Widl, W., CCITT:s standardisering av drafstödsnät. Ericsson Review. Nr 2, pp. 34–51 (1991) * In harmon.

* cited by examiner

SYSTEM AND METHOD FOR COMMUNICATIONS MANAGEMENT WITH REDUNDANCY

This application is a continuation of International Application No. PCT/SE96/01287, which was filed on Oct. 9, 1996, which designated the United States, and which is expressly incorporated here by reference.

The present invention relates to a system comprising at least one managing system and a number of first managed systems and a number of second managed systems in which redundancy is provided e.g. when management operations are performed by the managing system.

The invention also relates to a data storing managed system comprising a number of managed objects representing resources which is managed by a managing system able to perform management operations on the managed system.

Still further the invention relates to a method of providing redundancy in a system comprising at least a first and a second managed system each of which comprises a number of managed objects.

The invention also relates to a method of replicating management operations in a system comprising managed systems which are managed by a managing system.

BACKGROUND

The amount of information or data relating to a managed system can be high as well as complex to handle and sensitive etc. In these cases as well as in others it is often desirable to provide redundancy. Then it is important that the information or data in the redundant systems, which can be two or more, is the same and that when data in a system is changed by a managing system, it must be changed so that it remains consistent in the redundant managed systems.

In known systems replication of managed data of a managed system, e.g. a network element managed by TMN (Telecommunications Management Network) protocols can be carried out by replication of the actual changes of resource data from the network element that is addressed. Replicating on resource level is among others disadvantageous in that the further or secondary changes on a management level, in the MO such as consistency checks, logging, computer updates etc. are not replicated.

Replication can also be achieved through the managing system sending the same management operation to a number of redundant systems.

A serious drawback of implementing replication in this manner is that the management interface and the managing system, i.e. the operations system, themselves are affected which means that the operator and the Customer Administration System (CAS) must be aware of redundancy and therefore also be responsible for maintaining duplicated subscriber data etc.

In for example mobile communication systems of today real-time redundancy is often not applied but a number of systems are provided which merely provide for restoration in the case of a crash in for example a home location register. An example thereon is e.g. given in WO93/25051.

SUMMARY

Therefore a system is needed which is robust and which provides a high degree of availability and reliability by means of providing redundancy. A system is needed through which management operations can be provided in at least a first and a second managed system in such a way that the data in the at least two managed systems always will be accurate and up-to-date.

A system is also needed through which, in case a first managed system fails for some reason, a redundant second managed system immediately can start executing without any loss of data. Still further a system is needed through which management operations can be invoked in at least two managed systems so that the data is kept consistent in both (or more) systems at all times and in that the up-dates or similar operations are transferred to at least two systems in a safe and consistent manner.

A system is also needed wherein redundancy does not affect the managing system itself as well as it does not affect the management interface between the managing and managed systems respectively.

A method is also needed through which redundancy is provided in a safe and reliable way so that data in redundant systems always is up-to-date and consistent.

A method is also needed through which redundancy can be provided without affecting a managing system which manages two or more managed systems and also without affecting the management interface between managing and managed systems.

Therefore a system as initially referred to is provided in which management operations are replicated if redundancy is required. Advantageously the management operation is replicated in a first managed system whereafter it is sent to a second managed system. Advantageously the management operation is broken down into a number of managed object instance operations in the first managed system. The managed object instance operations are replicated and sent to the second managed system. A management operation may be a single operation in which case it merely addresses a single managed object instance or it may be a scope operation addressing a number of instances. Still further a filtering condition may be applied on the scope operation so that the management operation merely concerns some of the instances within the scope. This is in short called a filter operation.

In various embodiments one or more replication conditions may be given so that only instance operations fulfilling this or these conditions are replicated. The replication conditions may be of a number of different kinds. An example on a replication condition is that the instance operation has to be an up-dating operation. Generally, the management operations which can be performed on a managed object relate to the creation or deletion of an instance of a managed object, to the setting of an attribute value or the getting of an attribute value. A further operation relates to an action which requests a managed object to perform a task. All of these operations except for the getting of an attribute value relate to up-dating operations. The getting of an attribute value merely means reading and thus does not involve any change. Such an operation generally does not have to be replicated.

A number of conditions can be given in order that an operation be carried out in a first system for a start, such as an instance operation having to match instances comprised within the scope. Another condition relates to the instance operation having to match the instances comprised by the filter criteria. These are however not replication conditions but conditions for an operation to be carried out at all. This means that when scope and and filter conditions have been evaluated, those instances are identified which should be subjected to the management operation in the first managed system or in the addressed system. In addition to e.g. scope and filter conditions, there can be further conditions such as e.g. relating to access conditions, security conditions etc. Replication conditions thus only refer to conditions which are or can be given to control which operations among those that are to be performed in a first managed system, also are to be performed in a second managed system.

However, a replication condition can be that an instance object of an instance operation in a first managed system must have an instance replica in a second managed system or in other words there must be corresponding instances in the two managed systems in order to make a replication of any use. Of course, as far as e.g. create operations are concerned there is no MO-instance in either of the managed systems, e.g. NEs. The replication is then taken to mean that there shall be a replica in the second managed system (as well as in the first). Such a replication condition thus has to state whether a managed object instance has or shall have, a redundant replica in the second managed system or not. This can for example be achieved by defining a replication container (or more if needed) by pointing out a sub-tree root in the management information tree (MIT) in which case operations towards sub-tree roots and all the instances contained within it are replicated. However, the replication conditions can be different in different applications and of course also other conditions, e.g. particularly implementation specific conditions may be given. Generally replication conditions can be evaluated in an arbitrary order even if it is not always the case.

For explanatory reasons and in order to facilitate the understanding of the invention some concepts will be briefly discussed. The principles for a telecommunications management network are discussed in ITU-T (former CCITT) Recommendation M.3010. Systems management is also discussed in ITU-T Recommendation X.701. In a managed system the number of managed objects can be very high. In order to be able to keep track of all these managed objects they are kept in a tree structure which is denoted a Management Information Tree or a naming tree, c.f. ITU-T X.720. The Management Information Tree MIT forms the management view of a managed system or particularly a network element and the relationships forming the naming tree are called containment relations. A containment relationship means that a managed object of one class may contain other managed objects of the same or other classes. It constitutes a relationship between managed object instances. This is e.g. more thoroughly described and a particular solution is given in a Swedish patent application with application number 9502192-9 called "Arrangement and method relating to information managing systems" filed Jun. 16, 1995 by the same applicant which is incorporated herein by reference. Said application among others relates to mapping managed objects to resources.

A managed object is only contained within one containing managed object and containing managed objects may themselves be contained in other managed objects. The containing relationship is used for naming managed objects and managed objects which are named in the terms of another object are denoted subordinate objects of the former whereas a managed object which establishes the name in question for other objects is denoted a superior managed object of the latter. The highest level of the naming tree is denoted a root and it is as such an object without any associated properties.

All managed objects are given an instance name when they are created. All managed objects subordinated another managed object must have different instance names. Thus the instance name does not have to be unique within the naming tree but two or more managed objects can have the same instance name, the condition being that they are subordinated different managed objects. Every managed object also has a Distinguished Name DN. This name is unique within the naming tree and the naming starts from the root of the naming tree and ends with the instance name of the managed object.

A managed object may represent more than one resource or a combination of resources. A managed object may also represent other managed objects. Still further two or more managed objects may represent different views of one and the same resource etc.

However, returning to the redundancy issues, once it has been established that an instance operation is to be replicated, sometimes a translation has to be done for those parameters which have different values in the first and the second managed system respectively; for example the distinguished names can be different in a first and a second managed system. A mapping is then done between the instances of an addressed managed system and the redundant system and after translation, the instance operations are invoked in the first and second managed system respectively. The translation is according to a first embodiment carried out in the first managed system whereas according to an alternative embodiment it is done in the second managed system.

In particular embodiments of the present invention for scope or filter operations may apply so called atomic synchronization may be applied which means that an operation will only be performed if it can be successfully performed on every instance matching the scope and filter criteria that has been given. Alternatively best effort synchronization can be applied which means that an operation is performed on as many instances as possible.

In a particular embodiment of the invention relating to a Telecommunications Management Network the first and second managed systems comprise first and second network elements respectively and the managing system comprises an operations system. The management operations may particularly relate to operator updates relating for example to subscriber data etc. The first and second network elements even more particularly relate to a first and a second home location register of a mobile communication network. First and second respectively are merely denotations. Both the first and the second HLR (or managed system in general) act as a primary node for each one group of subscribers. In each HLR node there may be one or more primary subscriber groups and one or more secondary (back up) subscriber groups, i.e. a first HLR may act both as a primary HLR and as a stand-by or back-up HLR but for different groups. The same applies to the second HLR (one or more). Thus both a first and a second HLR (or managed system in general) have two functions.

A data storing managed system is also given which comprises a number of managed objects representing resources or resource objects, which managed system is managed by a managing system able to perform management operations thereon. On condition that a number of replication conditions are fulfilled, management operations broken down into managed object instance operations are replicated in the first managed system and sent to a second managed system which is provided for redundancy reasons. Thus the management operation is replicated indirectly via replication of instance operations.

Moreover a method is provided which comprises the steps of sending a management operation to a first managed system, establishing in the first managed system which managed object instances that are concerned and breaking down the management operation into a number of instance operations and for each instance operation, if replication conditions are given, finding out if these are fulfilled. If this is the case (or if no conditions are given), the instance operation is sent to at least one second managed system and the instance operation is invoked in the first and the second managed systems respectively. In an advantageous embodiment, if an operation failure occurs in any of the managed systems, the operations are revoked in both the first and the second managed system.

Moreover a method is provided for replicating management operations in a system comprising managing and managed systems respectively according to which a management operation is broken down into a number of managed object instance operations in a first managed system which instance operations are sent to at least one second, redundant, managed system after evaluation relating to which managed object instances are concerned. The instance operations are then invoked both in the first and in the second managed system. A number of instance operations can be executed either sequentially or in parallel.

Particularly an operation may be revoked in case it cannot be successfully carried out in both the first and the second managed system(s) respectively.

It should however be clear that when reference is made to a second managed system, there may also be a number of second managed systems; the principle still remains the same.

BRIEF DESCRIPTION OF THE DRAWINGS

The invention will in the following be further described in a non-limiting way under reference to the accompanying drawings in which.

DETAILED DESCRIPTION

The invention will in the following particularly be described in relation to a telecommunications management network which for example may take the form of Telecommunications Management Network TMN as described in ITU-T (former CCITT) Recommendation M.3010. A particular embodiment of the invention relates to managed systems in the form of Network Elements NE. Even more particularly the invention will be described under reference to a particular embodiment relating to the provision of Home Location Register HLR redundancy in a mobile communication system. The invention is however by no means limited to home location registers of mobile communication systems but it relates to replication of management operations on managed systems in general. The invention for example relates to a way of replicating management operations or particularly operator updates which for example can be used to realize redundancy in the management interface of managed systems (of which network elements or even more particularly home location registers relate to particular embodiments), which e.g. store sensitive data or large amounts of data. The invention also relates to other replications wherein a safe access to management operations is needed such as for example relating to remote restoration logs and audits etc.

Generally subscriber data in a Home Location Register HLR can be updated in essentially two ways, namely by the network via the Mobile Application Part MAP and via the Operation and Maintenance operator via a Telecommunications Management Network TMN or TMN-like management operations. The present invention relates particularly to updates provided via TMN (or a similar network), i.e. not to updates via MAP and not to ordinary telephony traffic making updates.

Figure 1:
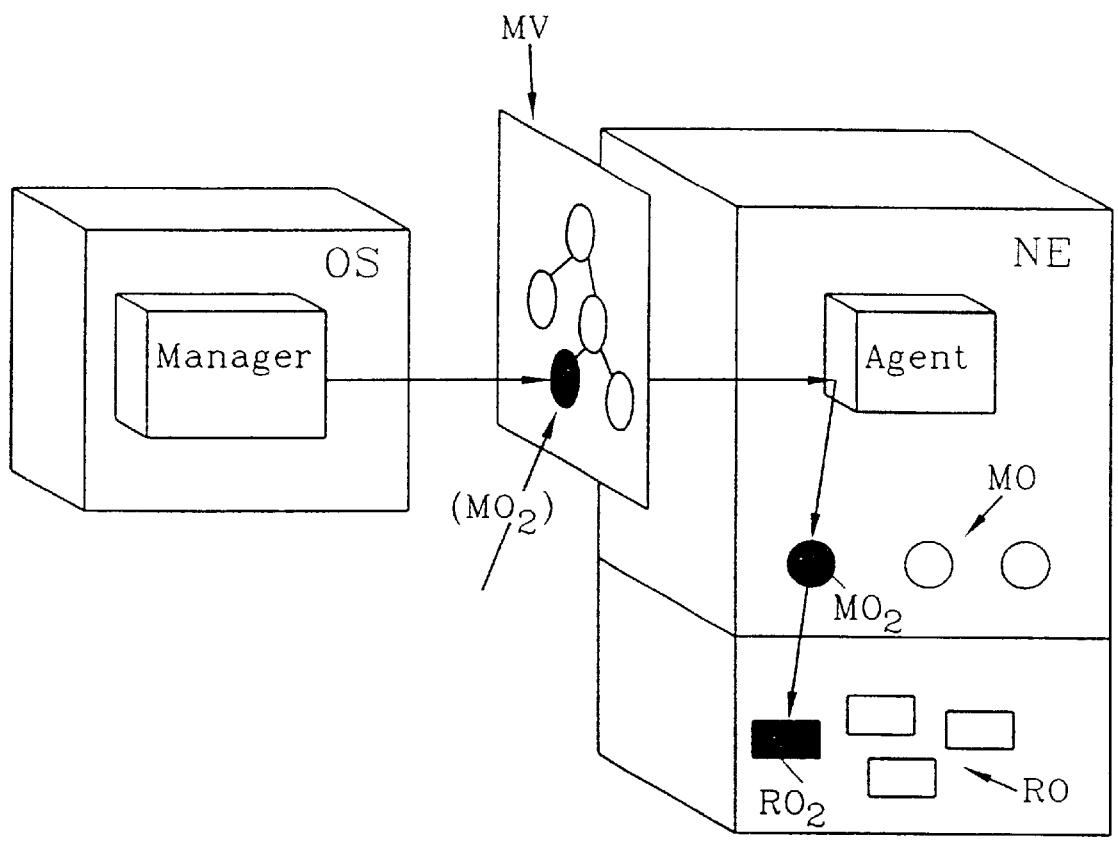
FIG. 1 schematically illustrates a single managed object instance operation.

FIG. 1 illustrates a managing system in the form of an Operations System OS managing a managed system, here particularly a Network Element NE of a Telecommunications Management Network. The extent of a telecommunications management network is standardized in the above-mentioned recommendation and it may comprise anything between a simple connection between an operations system and a network element and a whole network of operations systems controlling a large telecommunications network. An operator interface denoted Q3 has been standardized for a telecommunications system providing the connection between managing and managed systems, here operations system and network element.

The Q3 interface defines the object oriented information model of the network elements and the communication protocol between the Operations System OS and the Network Elements NE. Via the Q3 interface (e.g. relating to the GSM system the Q3 interface as standardized by TMN provides support for subscriber administration) an operator can do a number of operations on a Managed Object MO of a Network Element NE such as for example create a managed object, set a value in a managed object, get a value from a managed object, do an action on a managed object and delete a managed object. The Network Element NE can be said to be divided into a Management Layer ML comprising a number of Managed Objects MO which represent a number of resources or Resource Objects RO of a Resource Layer RL. The MO:s are all that is visible from the operations system and form the management view as is further explained below under reference to FIG. 1.

As already referred to earlier in the application the Managed Objects MO represent resources or Resource Objects RO which are the real implementation of the Network Element NE. A managed object may represent one or more resource objects or different managed objects may represent different views of one resource and a managed object may also represent a combination of resources. The resources or resource objects may comprise functional resources, logical resources or physical resources. A resource may e.g. be an internal resource in an MO or it may comprise an RO. Finally a managed object may represent other managed objects. The operation system OS can manipulate a management view of e.g. a traffic system represented by the resources by sending Q3 operations, i.e. management operations on the Q3 interface, from the manager to the agent. As referred to above MO instances can be arranged in a Management Information Tree MIT. A management operation may either address a single MO instance thus forming a single operation or a number of selected instances contained within a sub-tree of the MIT forming a scope operation. Such scope operations may furthermore be combined with one or more filter condition(s) in which case the operation will only be invoked on MO instances falling within the scope and matching the filter thus forming a scope and filter operation or shortly a filter operation. E.g. in known standards a scope can be defined in four different ways, namely: only the root object, the root object and all subordinate instances, the root object and all subordinated instances including line n and finally all instances on line n below the root object. In the present document the first scope is simply denoted a single operation whereas the other three are denoted scope operations or filter operations. This is merely a matter of denotation. However, this means that in a large network element NE or in for example a large HLR, a management operation may be directed to a large number of MO instances, which can be a quite time consuming operation.

FIG. 1 relates however to a single MO instance operation. A Managed Object $MO_2$ in the management layer ML represents a Resource Object $RO_2$ in the Resource Layer RL which forms the resource implementation of the Managed Object $MO_2$ and the storage of attribute values for $MO_2$. The resources are not visible to the operator or the Operations System OS but only the managed objects representing them, via the Management View MV as illustrated. From FIG. 1 can be seen the Managed Object $MO_2$ e.g. denoting a MO of a "subscriber 2". The managing system OS manipulates the management view of the traffic system (resources) by sending Q3 operations from the manager of the OS to the agent of the NE.

Scope and filter operations as referred to above can be synchronized in substantially two different ways, namely atomic synchronization and best effort synchronization. With atomic synchronization is meant that a management operation will either be successfully performed on all or none of the instances matching the scope and filter criteria whereas a best effort synchronization means that an operation will be performed on as many instances as possible. In other words, if a scope operation with atomic synchronization fails for one MO instance, all changes will be undone and the complete operation will fail. If however best effort synchronization is applied, the operation will still be performed on the other instances irrespectively of whether it failed for one (or more) MO instance.

According to a particular embodiment a first and a second Home Location Register $HLR_1$, $HLR_2$ constitute the first and the second managed systems respectively. Of course there could also be more than one second managed system; second managed systems in the present document merely meaning that there is one or more than one system holding the corresponding data of another or a first system in any combination. There is also no inherent difference between a first and a second system. The denotation is merely used to indicate that there are more than one system, and that particularly one thereof is addressed.

Management operations towards a subscriber may be sent to either of the two Home Location Registers (in case there are two, if there are more than two, the operations can be sent to any of them) holding the corresponding data. Then the HLR receiving the management operation shall update the other one accordingly. Generally management operations towards a particular subscriber are directed to a particular HLR node. However, the invention is not affected by the addressing policy of any customer administration system.

Figure 2:
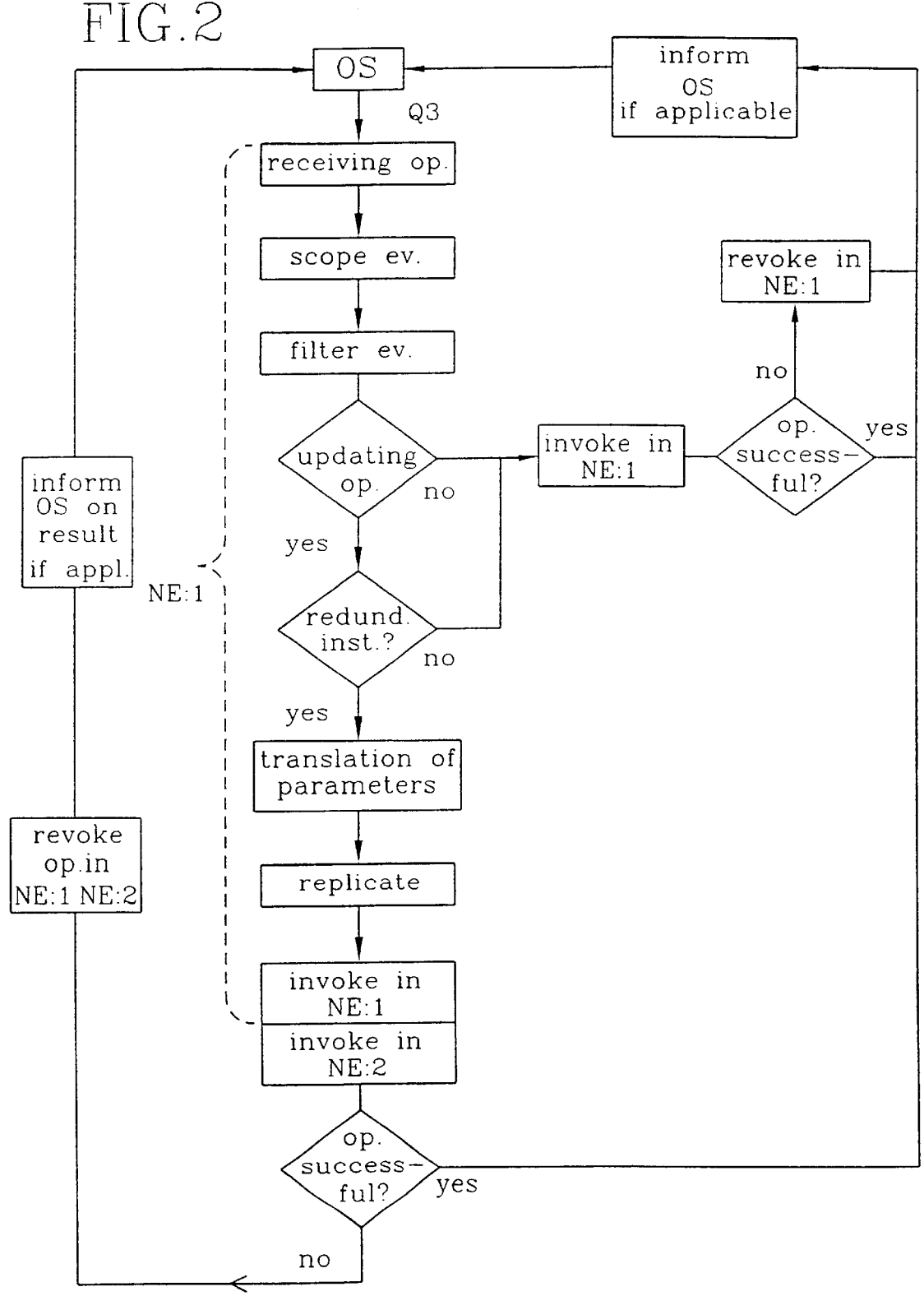
FIG. 2 is a schematical flow diagram relating to a scope and filter operation with replication, and FIG. 3 schematically illustrates a scope and filter operation with replication including distributed transactions.

FIG. 2 is a schematical flow diagram (giving one example on a flow) illustrating replication of a management operation sent from an Operations System OS relating to operator updates to a first Network Element NE, (which e.g. may be an HLR) over the Q3 interface. When the operation has been received in the addressed managed system, e.g. $NE_1$, a scope evaluation is carried out to establish which MO instances are concerned (or the maximum number of MO instances concerned). As referred to above, a management operation can be a single operation, a scope operation or a filter operation. When the scope has been established it is checked whether any filter criteria are to be fulfilled. This means that if a filtering is to be done, the filter is applied on each MO instance and the result thereof is a set of MO instances within the scope to which the operation has to be applied.

Moreover one or more replication conditions can be given which have to be fulfilled by the instance operations in order that they be replicated. It should be noted that there does not have to be any replication conditions, but that there may be one or more. Moreover the internal order of independent replication conditions is not important. They can often be evaluated in any order. One example on a replication condition is that the operation is an updating operation. This means that the operation as such must change data; if data is not changed, there is no need for a replication. As discussed earlier in the application the operations create, set, delete and action are operations which may change data. If the operation is not an updating operation, data can be read etc, this being irrelevant for the present invention. Generally the operation is then only invoked locally in $NE_1$.

If however the operation is of an updating nature, a second replication condition (as already discussed above the order is not relevant but they are just denoted first, second etc. for exemplifying reasons) states that an MO instance has to be redundant. This means that it is examined whether the MO instance as such is or shall be present in both $NE_1$ and $NE_2$. If there is no, or shall not be such an MO instance in the second managed system $NE_2$, it is incorrect to replicate that instance operation. The replication condition relating to whether an MO instance has a redundant replica in a second Network Element $NE_2$ can take a number of different forms, for example depending on the implementation concerned etc. One example thereon may relate to a replication container which is defined by pointing out a sub-tree root in the MIT. Then operations towards the sub-tree root and all the instances contained within it, are to be replicated.

If the given replication conditions are fulfilled (the replication conditions discussed above merely constitute examples, a number of alternatives are possible and there can be fewer as well as more), the instance operation is sent to $NE_2$. Before that however, if there are any node specific parameters in the operation, these have to be translated into the corresponding values for $NE_2$. This is the case for attributes in operations of type distinguished name since the MO instances in the first and the second NE respectively have different distinguished names.

Alternatively the translation can be carried out in the second managed system after replication of the operation, but before invoking it in $NE_2$. After translations are done, the corresponding instance operation is invoked in the second managed system, here $NE_2$. If the operation is successful both in $NE_1$, $NE_2$, this can be reported to the operations system if the operator so requests. The sending of confirmation reports can also depend on the kind of operation etc. For example, according to ITU-T X.710 success confirmation and failure confirmation is applied for create, delete, get, set and action operating only if the operator so requiests. If however the operation fails in any of $NE_1$, $NE_2$, it is rolled back or undone in some way and the Operations System OS is informed thereon, e.g. via an error message if failure confirmation is applicable.

In order to make sure that the content in $NE_1$ is consistent with the content in $NE_2$, the operations in the two NEs may be included in a distributed transaction. The data will then be updated consistently in both systems. This is particularly important if the management operation is a so called atomic scope operation wherein the transactions may include thousands of MO instances.

If the management operation is a single operation or a best effort scope operation, there will be several distributed transactions, one for each instance operation. If on the other hand the management operation is an atomic scope operation there will only be one distributed transaction which includes all instance operations.

According to a first embodiment the instance operations are done consecutively one by one. This means that for an instance operation on an MO meeting e.g. scope and filter requirements the replication conditions are examined (in any desired order), translations (if any) and replication is done and the operation is invoked in both (in case there are two) NE:s. Only after invoking the operation is proceeded to the next instance operation. In an alternative embodiment a number of instance operations are invoked parallelly, i.e. the whole procedure is done in parallell. If the execution is done in sequence or in parallell or partly parallell etc. depends e.g. on the particular implementation.

Figure 3:
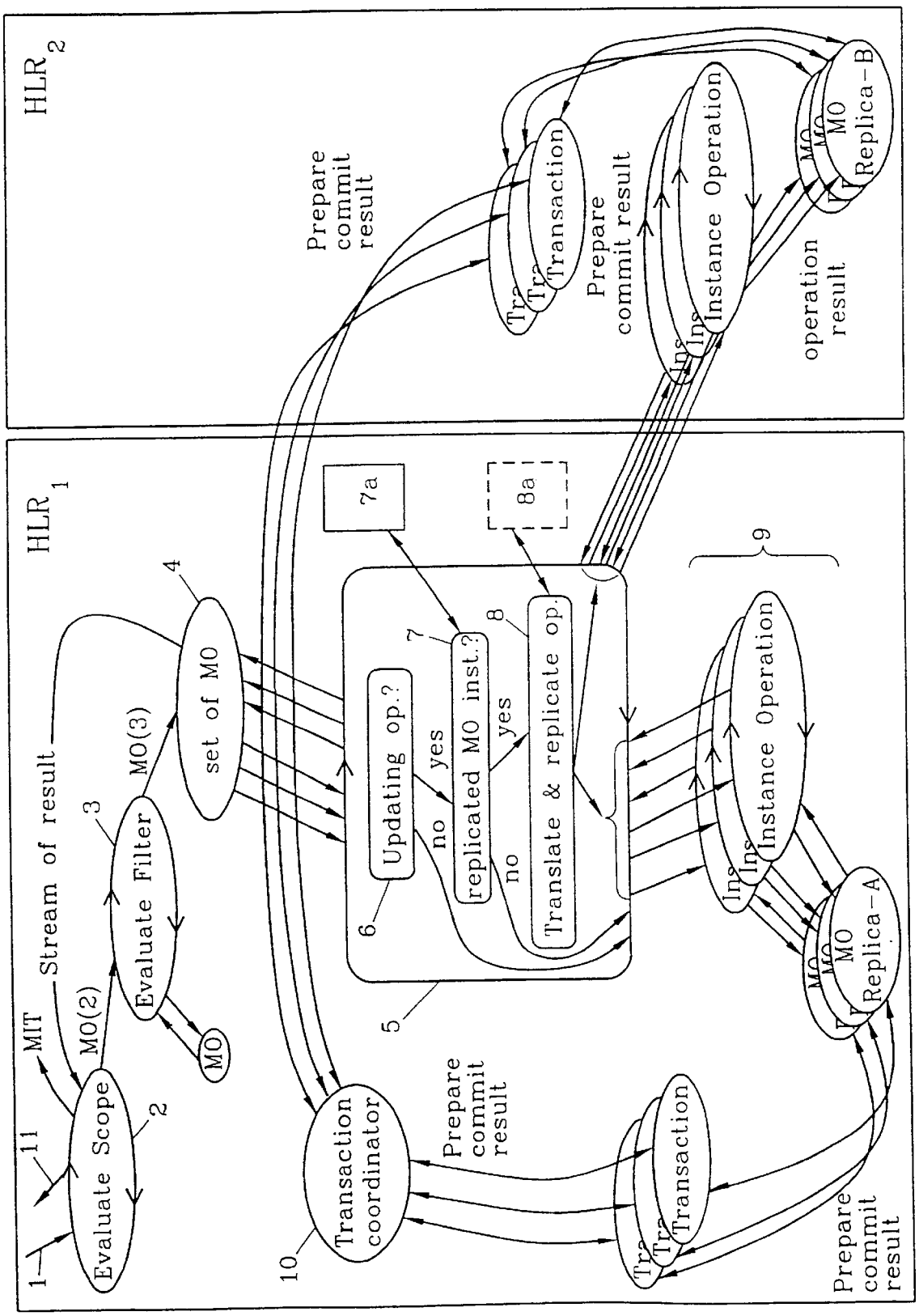

FIG. 3 more clearly illustrates a scope and filter operation with replication wherein the invocation of the operations is included in coordinated transactions. In FIG. 3 a scope and filter management operation with best effort synchronization is sent to a first managed system, which in this embodiment is a Home Location Register $HLR_1$.

"1" indicates the reception of the management operation in the addressed $HLR_1$. A scope evaluation 2 is then carried out as also discussed under reference to FIG. 2. The scope evaluation results in a set of MO instances, i.e. a stream of objects MO(2) to which the filter is to be applied through a filter evaluation 3. The filter is applied on each MO instance and the result thereof is a set of MO instances or a stream of objects MO(3) to which the operation is to be applied, i.e. a set of selected managed objects 4 is formed.

The instance operations are then transmitted (e.g. one by one) to the replication function 5 which comprises a number of replication conditions as also discussed earlier. According to the first (here) replication condition 6 is checked whether the operation is an updating operation, i.e. if it relates to creation of, deletion of, setting a value in or doing an action on a managed object. If the operation is not an updating operation, no replication is carried out and the operation may then only be invoked locally. If on the other hand it is established that it is an updating operation, then the second replication condition 7 is evaluated for each selected MO instance to see if it is a redundant MO instance, i.e. if the MO instance shall be replicated. This is done for example-by pointing out a sub-tree in the MIT 7a.

If it is not a redundant MO instance, no replication takes place and the operation is only invoked locally. For each redundant MO instance however, a translation is done and the corresponding instance operation is sent to the second HLR, $HLR_2$. As referred to earlier, the translation can in principle be done either in the first or in the second HLR, if only it is done before invoking the operation in the second HLR. It should however be noted that only node-specific parameters of the operation have to be translated as discussed above under reference to FIG. 2. The translation operation may e.g. be carried out via replica-mapping 8a between two MIT:s.

In $HLR_2$ the operation is invoked within a transaction on the MO replica-B. The instance operation 9 is also invoked within a transaction on the local MO replica-A in $HLR_1$. Via the transaction coordinator 10 the transactions are so coordinated that the operation either succeeds in both or none of the first and second $HLR_1$ and $HLR_2$ respectively. The alternatives of synchronization of scope or filter operations have already been discussed. If it is a scope operation with best effort synchronization, the transactions will be coordinated per replicated MO pair (one in $HLR_1$ and one in $HLR_2$). If the operation is a scope operation with atomic synchronization the coordinated transaction will include all instance operations.

Finally, if the operation succeeds both in $HLR_1$ and $HLR_2$ a confirmation that the operation has been successful may be sent to the operator or to the operations system even if this is not the case for all operations. For some operations the operator can choose if he wants a confirmation or not. If however the operation has failed either in $HLR_1$ or in $HLR_2$ (or both), a message that the operation has failed is in some cases sent to the operator as the result 11 (for a number of operations (as discussed earlier) only if the operator so requests).

Although the invention has been particularly described under reference to managed systems in the form of home location registers in a mobile communication system, the invention is by no means limited thereto but applies to any kind of managed system wherein management operations are carried out by an operator or an operations system or generally it is applicabale to any application wherein access to management operations is needed such as for example remote logs and audits etc.

It is an advantage of the invention that the operator or an operation system does not have to be aware about redundancy or in other words redundancy is hidden for the operator or operations systems. Moreover standardized management interfaces are not affected by the replication.

Another advantage of the invention is that scope synchronization is preserved. Moreover, apart from handling attribute values, use is made of additional MO functionality such as for example consistency checks. It is to be noted that in case the MO functionality results in external event reports or invokation of signalling (MAP) services, the information model might require that such events are suppressed in some of the NEs in order to prevent multiple or incorrect external events. Still other advantages are that 2 and 3 phase commit transaction protocols are rendered possible and interference with MAP (Mobile Application Part) traffic as well as other management operations adressing either one of the redundant nodes is prevented by synchronous locking of MO instances. The latter relates to the particular embodiment as described relating to a mobile communication system. However, the invention can be varied freely, being merely limited by the scope of the claims.

What is claimed is:

1. A system comprising at least one managing system, a number of first managed systems and a number of second managed systems, each managed system comprising a number of managed objects representing resources, a management interface for providing communication between managing and managed systems via which management operations can be sent from the managing systems to the managed system(s), wherein for providing redundancy a management operation is replicated and provided to a first and to at least one second managed system and the replication is done in the first managed system, and the management operation is broken down into a number of managed object instance operations, the management operation being replicated by replication of the managed object instance operations, and wherein CMIP operations on sets of managed objects in an MIB in one network element are transformed into sets of simple CMIP operations on managed objects in another MIB in another network element while relationship consistency is preserved.

2. A system according to claim 1, wherein, the management operation is processed and replicated in the first managed system and in that it is sent from a first managed system to at least one second managed system.

3. A system according to claim 2, wherein via processing in the first managed system, the management operation is broken down into the number of managed object instance operations.

4. A system according to claim 1, wherein the management operation is a single operation, addressing a single managed object instance.

5. A system according to claim 1, wherein the management operation is a scope operation addressing a number of Managed Object instances.

6. A system according to claim 5, wherein, at least one filtering condition is applied on the scope operation, the management operation thus forming a filter operation.

7. A system according to claim 5, wherein one or more replication conditions are given and in that only instance operations fulfilling the given replication condition(s) are replicated.

8. A system according to claim 7, wherein a first replication condition states that the instance operation has to be an updating operation.

9. A system according to claim 8, wherein the instance operation relates to one or more of the operations creating a managed object, deleting a managed object, setting a value in a managed object and invoking an action on a managed object instance.

10. A system according to claim 7, wherein the replication conditions only are used on the instance operations matching instances comprised within the scope of the operation.

11. A system according to claim 7, wherein that according to a further replication condition an object instance of an instance operation in a first managed system shall have an instance replica in a second managed system.

12. A system according to claim 11, wherein at least one replication container is defined by pointing out a sub-tree root in a management information tree containing the managed object instances and for instance operations towards sub-tree roots and/or all instances contained within that, a replication is carried out unless any other replication conditions are not fulfilled.

13. A system according to claim 1, wherein for replicated instance operations, a translation is done in the first or the second managed system of those parameters having different values in the first and the second managed systems respectively.

14. A system according to claim 5, wherein that the scope or filter operations are atomic synchronization operations, and an operation will only be performed if it can be successfully performed on every instance matching the scope and/or filter conditions and all their replicas.

15. A system according to claim 5, wherein the scope or filter operations are best effort synchronization operations, the operation is performed on all replicas of as many instances as possible.

16. A system according to claim 1, wherein the first and second managed systems comprise a first and second network element, and the managed objects in the first and second managed systems comprise management information bases.

17. A system according to claim 16, wherein the first and the second network elements respectively comprise a first and a second Home Location Register in a mobile communications network.

18. A data storing managed system comprising a number of managed objects representing resources or resource objects, wherein the system is managed by a managing system able to perform management operations on the managed system, and if a number of condition(s) is/are fulfilled, a management operation on one or more managed object instances is replicated in the managed system and sent to a second managed system thus providing redundancy, and the management operation is broken down into a number of managed object instance operations in the managed system and the management operation is replicated indirectly by replication of the managed object instance operations, and wherein CMIP operations on sets of managed objects in an MIB in one network element are transformed into sets of simple CMIP operations on managed objects in another MIB in another network element while relationship consistency is preserved.

19. Mobile communication system comprising a number of first Home Location Registers and a number of second Home Location Registers wherein the subscriber data is substantially the same in a first Home Location Register and a corresponding second Home Location Register and operator updates are addressed to a first Home Location Register, and the operator updates are replicated in the first Home Location Register and sent to the corresponding second Home Location Register without affecting the operator and the interface between operator and the first Home Location Register, and the operator updates are broken down into a number of instance operations, the operator updates being replicated by replication of the instance operations, and wherein CMIP operations on sets of managed objects in an MIB in one network element are transformed into sets of simple CMIP operations on managed objects in another MIB in another network element while relationship consistency is preserved.

20. Mobile communication system according to claim 19, wherein if any operator updates cannot be successfully performed both in a first and at least one redundant second Home Location Register, the up-dates are revoked in both the first and second Home Location Registers.

21. A method of providing redundancy in a system comprising at least a first and a second managed system, each of which comprises a number of managed objects, the method comprising the steps of:
   when a management operation is sent to a first managed system:
   establishing in the first managed system which managed object instances that are concerned,
      breaking down the management operation into a number of instance operations, and
   for each instance operation:
      examining if any replication conditions are given, and if so, examining if the replication conditions are fulfilled,
      if the replications conditions are fulfilled, sending a replicated instance operation to the at least one second managed system, and
      invoking the instance operation and the replicated instance operation respectively in the first and second managed systems, wherein CMIP operations on sets of managed objects in an MIB in one network element are transformed into sets of simple CMIP operations on managed objects in another MIB in another network element while relationship consistency is preserved.

22. Method according to claim 21, it further comprising the step of:
   translating the parameters of an instance operation that have different values in the first and second systems respectively.

23. Method according to claim 22, wherein the translation is done in the first managed system before sending the instance operation to the second managed systems.

24. The method according to claim 22, further comprising the steps of:

making the translation in the second managed system, and invoking the replicated instance operation.

25. Method according to claim 21, wherein the instance operations of a management operation are replicated and invoked one by one.

26. Method according to claim 21, wherein a number of instance operations of a management operation are handled parallelly at least in part.

27. A method according to claim 21, wherein if an operation failure occurs in one of the managed systems, the operations are revoked in both the first and second managed systems.

28. A method of replicating management operations in a system comprising redundant managed systems, comprising the steps of:

establishing which instance operations correspond to a management operation, for each instance operation, examining if any replication conditions are given, and if an instance operation fulfills the given replication conditions or if there are no conditions, replicating the instance operation, sending the replicated instance operation to at least one of the redundant managed systems, and invoking the instance operation and the replicated instance operation in the redundant systems, wherein CMIP operations on sets of managed objects in an MIB in one network element are transformed into sets of simple CMIP operations on managed objects in another MIB in another network element while relationship consistency is preserved.

* * * * *